(12) United States Patent
Darrow, Jr. et al.

(10) Patent No.: US 10,336,444 B2
(45) Date of Patent: Jul. 2, 2019

(54) COMPOSITE STIFFENED RIGID PROPELLER SHAPED MAIN ROTOR HUB

(71) Applicant: Sikorsky Aircraft Corporation, Stratford, CT (US)

(72) Inventors: David A. Darrow, Jr., Stratford, CT (US); Frederick J. Miner, Barkhamsted, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 317 days.

(21) Appl. No.: 14/915,084

(22) PCT Filed: Jun. 13, 2014

(86) PCT No.: PCT/US2014/042232
§ 371 (c)(1),
(2) Date: Feb. 26, 2016

(87) PCT Pub. No.: WO2015/047469
PCT Pub. Date: Apr. 2, 2015

(65) Prior Publication Data
US 2016/0200431 A1 Jul. 14, 2016

Related U.S. Application Data

(60) Provisional application No. 61/871,071, filed on Aug. 28, 2013.

(51) Int. Cl.
*B64C 27/32* (2006.01)
*B64C 27/10* (2006.01)
*B64C 27/82* (2006.01)

(52) U.S. Cl.
CPC .............. *B64C 27/32* (2013.01); *B64C 27/10* (2013.01); *B64C 2027/8236* (2013.01)

(58) Field of Classification Search
CPC ......... B64C 27/32; B64C 27/10; B64C 27/50; B64C 2027/8236
See application file for complete search history.

(56) References Cited

U.S. PATENT DOCUMENTS

| 3,310,120 | A | | 3/1967 | Vacca | |
|---|---|---|---|---|---|
| 3,759,632 | A | | 9/1973 | Rybicki | |
| 4,212,588 | A | | 7/1980 | Fradenburgh | |
| 4,306,836 | A | * | 12/1981 | Mayerjak | B64C 27/32 416/134 A |
| 4,778,340 | A | * | 10/1988 | Pariani | B64C 27/32 416/114 |
| 2007/0215749 | A1 | | 9/2007 | Miner et al. | |
| 2008/0292468 | A1 | * | 11/2008 | Stamps | B64C 27/32 416/244 R |

(Continued)

OTHER PUBLICATIONS

International Search Report and Written Opinion dated Mar. 3, 2015 in corresponding PCT Application No. US2014/042232.

(Continued)

*Primary Examiner* — Woody A Lee, Jr.
*Assistant Examiner* — Aye S Htay
(74) *Attorney, Agent, or Firm* — Cantor Colburn LLP

(57) ABSTRACT

A rotor includes a blade retention cuff configured to receive a rotor blade; a yoke coupled to the blade retention cuff; and a rigid propeller shaped hub configured to enclose at least a portion of the blade retention cuff and at least a portion of the yoke.

18 Claims, 4 Drawing Sheets

(56) References Cited

U.S. PATENT DOCUMENTS

2009/0097973 A1    4/2009  Cabrera et al.
2016/0090175 A1*   3/2016  Ropars ............... C22C 32/0047
                                                        464/178

OTHER PUBLICATIONS

Aviation Images—Aircraft in Detail, "Helicopter Rotorhead Gallery", downloaded from http://www.b-domke.de/AviationImages/Rotorhead.html on Oct. 30, 2013, 29 pages.
Tim McAdams, "Starflex Rotor", AOPA Hover Power, May 25, 2011, 4 pages.
Wikipedia, "Helicopter Rotor", downloaded from http://en.wikipedia.org/wiki/Helicopter_rotor on Oct. 30, 2013, 9 pages.
PCT International Preliminary Report on Patentability; International Application No. PCT/US2014/042232; International Filing Date: Jun. 13, 2014; dated Mar. 1, 2016; pp. 1-7.

* cited by examiner

COMPOSITE STIFFENED RIGID PROPELLER SHAPED MAIN ROTOR HUB

CROSS-REFERENCE TO RELATED APPLICATIONS

This application claims the benefit of PCT Application No. US2014/042232, filed on Jun. 13, 2014, which claims the benefit of U.S. Provisional Application No. 61/871,071, filed Aug. 28, 2013. The contents of both PCT Application No. US2014/042232 and U.S. Provisional Application No. 61/871,071 are incorporated herein by reference.

STATEMENT REGARDING FEDERALLY SPONSORED RESEARCH AND DEVELOPMENT

This invention was made with government support under Technology Investment Agreement W911W6-13-2-0003 with the United States Army. The government has certain rights in this invention.

BACKGROUND

In aerospace applications it is beneficial to reduce the weight of an aircraft. At the same time, the integrity of the aircraft or the aircraft structure needs to be maintained. In this respect, in the context of a rotor design for a rotorcraft (e.g., a helicopter), a light-weight rotor is needed. A reduction in drag associated with the rotor or rotor blades relative to conventional designs would also help to improve efficiency.

In conventional rotor designs, loads imposed upon the rotor or rotor blades may serve to degrade the reliability and maintainability of the rotor. Improvements are needed to conventional rotor designs in terms of the handling of such loads in order to enhance the performance and sustainability of the rotor.

BRIEF SUMMARY

In accordance with an aspect of the invention, a rotor includes a blade retention cuff configured to receive a rotor blade; a yoke coupled to the blade retention cuff; and a rigid propeller shaped hub configured to enclose at least a portion of the blade retention cuff and at least a portion of the yoke.

In addition to one or more of the features described above, or as an alternative, in further embodiments the blade retention cuff is attached to the rotor blade using at least two pins.

In addition to one or more of the features described above, or as an alternative, in further embodiments the at least two pins are configured to be removed to enable the rotor blade to fold.

In addition to one or more of the features described above, or as an alternative, in further embodiments the yoke is made of titanium and is substantially horseshoe-shaped, and wherein the yoke is configured to be bolted to the blade retention cuff.

In addition to one or more of the features described above, or as an alternative, in further embodiments an inboard bearing is located in the interior of the yoke configured to restrain centrifugal force while enabling the yoke to pitch through an entire operating range.

In addition to one or more of the features described above, or as an alternative, in further embodiment an outboard bearing comprising a radial element is configured to contact a top-side of the blade retention cuff when the rotor blade is subjected to an upward force.

In addition to one or more of the features described above, or as an alternative, in further embodiment a hub spool is bolted to the propeller shaped hub.

In addition to one or more of the features described above, or as an alternative, in further embodiments the propeller shaped hub is made of a graphite epoxy composite material.

In addition to one or more of the features described above, or as an alternative, in further embodiments a second blade retention cuff is configured to receive a second rotor blade; and a second yoke coupled to the second blade retention cuff, wherein the propeller shaped hub is configured to enclose at least a portion of the second blade retention cuff and at least a portion of the second yoke.

In addition to one or more of the features described above, or as an alternative, in further embodiments, the rotor is included on an aircraft.

In accordance with an aspect of the invention, a method for fabricating a rotor includes coupling a blade retention cuff configured to receive a rotor blade to a yoke; and enclosing at least a portion of the blade retention cuff and at least a portion of the yoke using a rigid propeller shaped hub.

In addition to one or more of the features described above, or as an alternative, in further embodiments, the blade retention cuff is attached to the rotor blade using at least two pins.

In addition to one or more of the features described above, or as an alternative, in further embodiments, the method includes removing the at least two pins to enable the rotor blade to fold.

In addition to one or more of the features described above, or as an alternative, in further embodiments, the yoke is made of titanium and is substantially horseshoe-shaped, and wherein the yoke is bolted to the blade retention cuff using at least four bolts.

In addition to one or more of the features described above, or as an alternative, in further embodiments, the method includes coupling an inboard bearing to the yoke within the interior of the yoke, wherein the inboard bearing is configured to restrain centrifugal force while enabling the yoke to pitch through an entire operating range.

In addition to one or more of the features described above, or as an alternative, in further embodiments, the method includes coupling an outboard bearing comprising a radial element to the blade retention cuff, wherein the outboard bearing is configured to contact a top-side of the blade retention cuff when the rotor blade is subjected to an upward force during lift.

In addition to one or more of the features described above, or as an alternative, in further embodiments, the method includes bolting a hub spool to the propeller shaped hub.

In addition to one or more of the features described above, or as an alternative, in further embodiments, the propeller shaped hub is made of a graphite epoxy composite material.

In addition to one or more of the features described above, or as an alternative, in further embodiments, the method includes coupling a second blade retention cuff configured to receive a second rotor blade to a second yoke; and enclosing at least a portion of the second blade retention cuff and at least a portion of the second yoke.

In addition to one or more of the features described above, or as an alternative, in further embodiments, the method includes selecting a stiffness and mass for the rotor to satisfy a natural frequency criteria.

Technical function of the one or more features described above provides a lightweight rotor hub for an aircraft.

Other aspects, features, and techniques of the invention will become more apparent from the following description taken in conjunction with the drawings.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
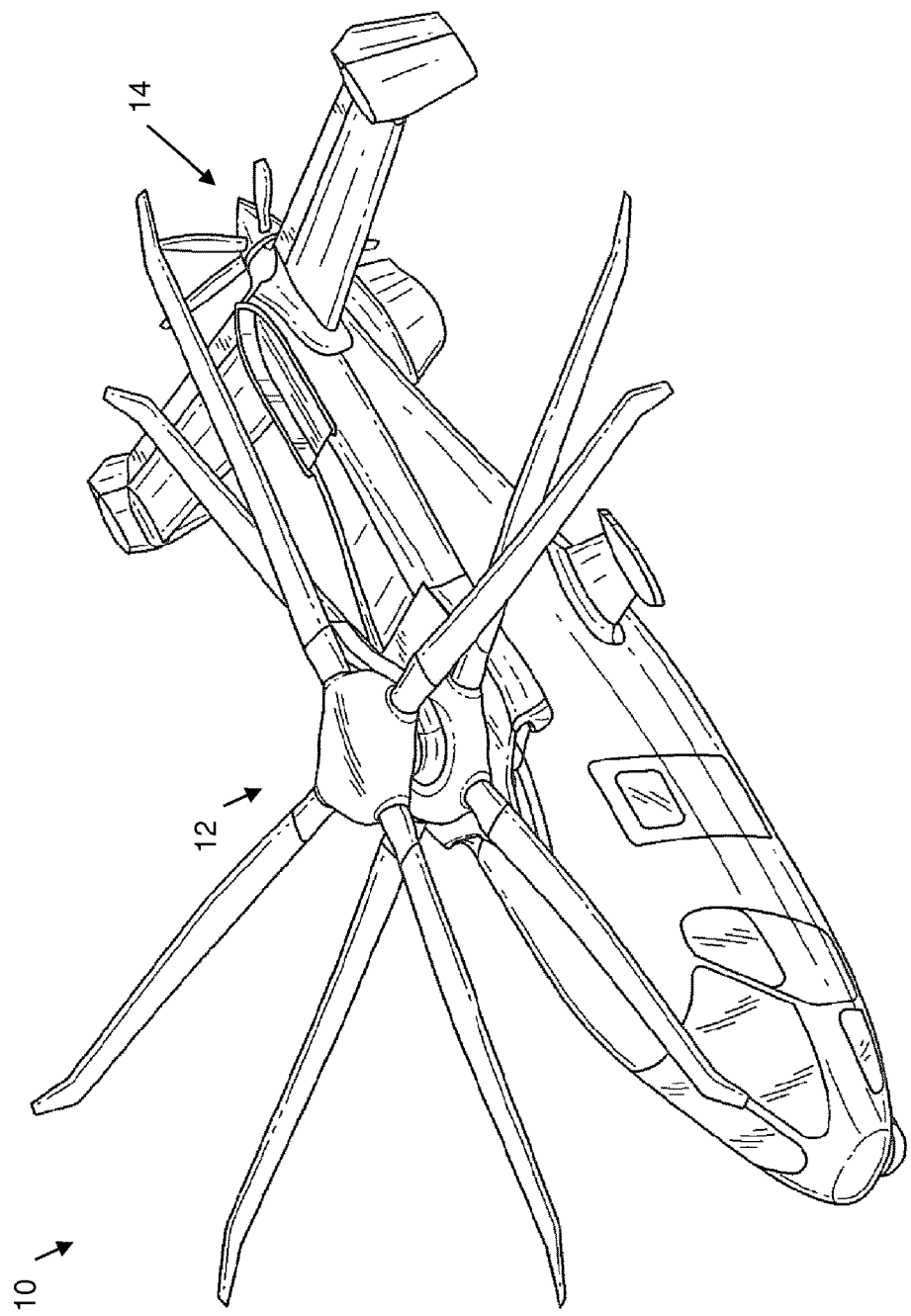
FIG. 1 is a general perspective side view of an exemplary aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described regarding the design and use of a rotor. In some embodiments, blades associated with a rigid rotor may be folded while providing a high bending stiffness to meet rotor blade tip clearance criteria. A stiffness and mass for the rotor may be selected to meet or satisfy a natural frequency criteria. A rotor design in accordance with one or more embodiments may have repeatable manufacturing or fabrication quality. The weight of the rotor may be minimized. In some embodiments, one or more components or devices of the rotor may be fabricated or manufactured using composite materials, such as graphite epoxy. The rotor may be deployed on an aircraft.

Referring now to FIG. 1, a general perspective view of a helicopter 10 is shown. The helicopter 10 includes a coaxial rotor assembly 12 and tail propeller assembly 14. Although a particular helicopter configuration is illustrated and described in the disclosed embodiment, other configurations and/or machines (e.g., other aircraft configurations) may be used in connection with this disclosure. For example, in some embodiments a rotorcraft may include a single rotor or rotor system.

Figure 2:
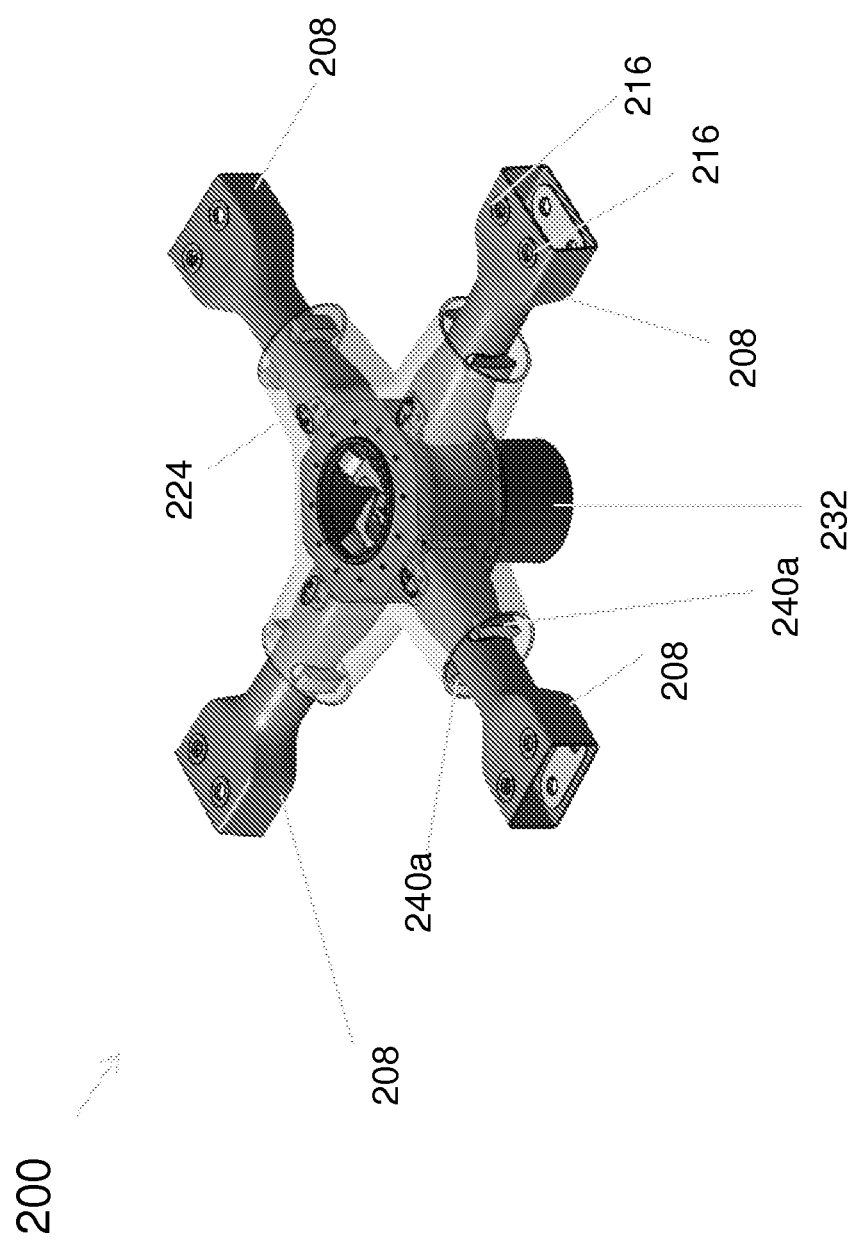
FIG. 2 is a top-perspective view of a rotor system.
Figure 3:
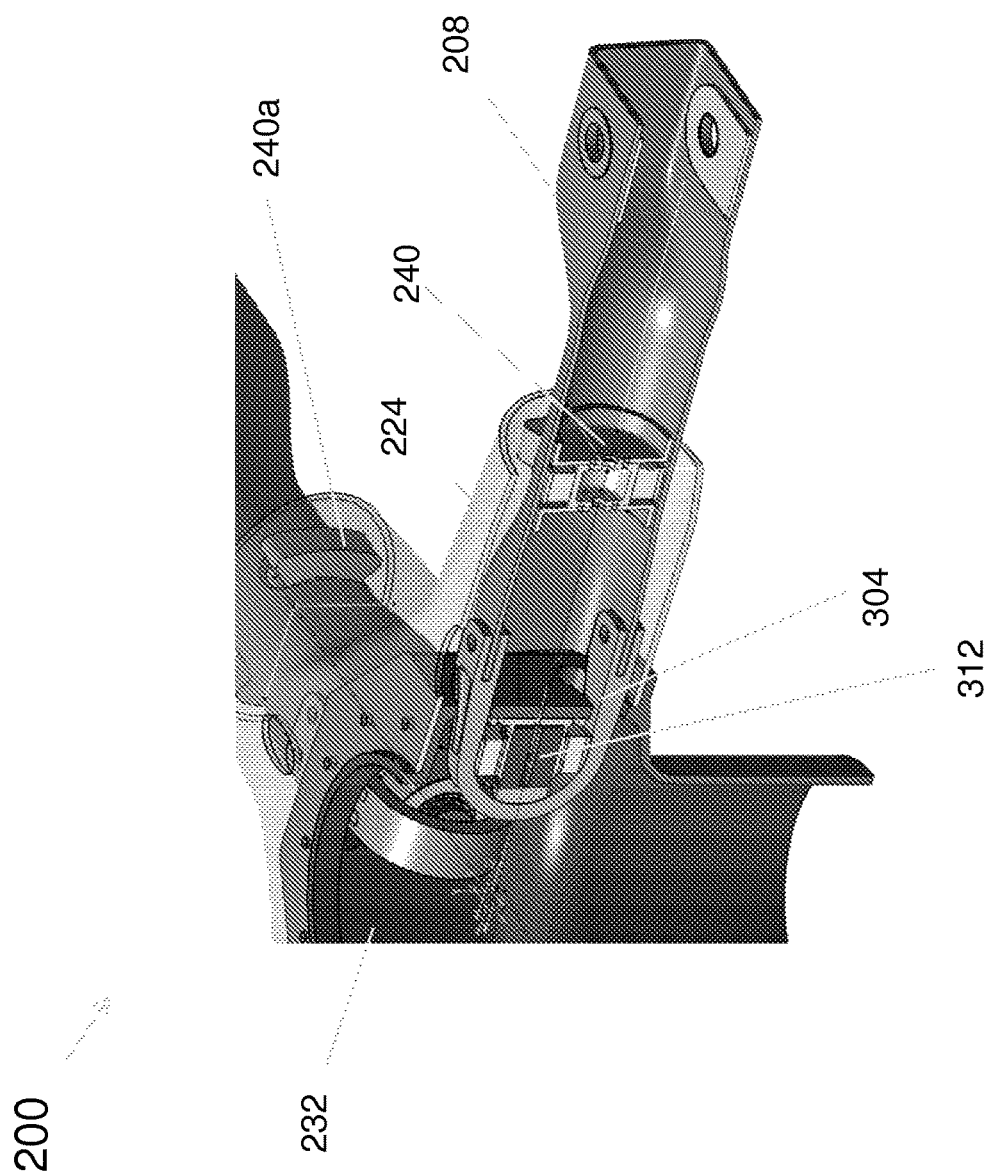
FIG. 3 is a side-perspective view of the rotor system of FIG. 2.

Turning to FIGS. 2-3, a rotor system 200 in accordance with one or more embodiments is shown. The rotor system 200 may correspond to a composite stiffened rigid propeller shaped main rotor hub used in the coaxial rotor assembly 12.

The rotor system 200 includes a number of blade retention cuffs 208. The embodiment of FIG. 2 includes four blade retention cuffs 208, however, any number of blade retention cuffs 208 may be used in a given embodiment.

The rotor system 200 or the blade retention cuffs 208 may be associated with a tube-within-a tube structure. Each of the blade retention cuffs 208 may be configured to receive or attach to a rotor blade (not shown in FIG. 2). Two pin locations 216 provided on each blade retention cuff 208 may be used in connection with respective pins to attach a blade to the blade retention cuff 208. The pins may be pulled out or removed to allow a rotor blade to move or transfer away from the center of the rotor system 200. Even when the pins are removed, the (weight of the) rotor blades may still be supported by the rotor system 200.

The blade retention cuffs 208 may be at least partially enclosed or encased by a propeller hub 224. The blade retention cuffs 208 may be received by or attached to a yoke 304 via one or more bolts. For example, in an embodiment four bolts may be used, where two bolts may be used on a first side of the yoke 304 to attach to a first side or potion (e.g., the top) of the blade retention cuff 208 and two bolts may be used on a second side of the yoke 304 to attach to a second side or potion (e.g., the bottom) of the blade retention cuff 208. In an embodiment, the yoke 304 may be substantially horseshoe-shaped as shown in FIG. 3.

The interior of the yoke 304 may include one or more thrust bearings 312. The thrust bearing 312 may be configured to restrain centrifugal force (CF) while enabling the yoke 304 to pitch through an entire operating range. For example, as a rotor blade tends to pull outward or away from the center of the rotor system 200, the bearing 312 may serve to hold or retain the rotor blade. In some embodiments, the bearing 312 may be cylindrically shaped. In some embodiments, the bearing 312 may be an elastomeric bearing.

In addition to coupling to the blade retention cuff 208, the yoke 304 may couple to, and be at least partially enclosed in, a hub spool 232. The hub spool 232 may provide support for the rotor system 200, such as when the rotor system 200 is driven or rotated. The propeller hub 224 may be bolted to the hub spool 232.

As a rotorcraft associated with the rotor system 200 is operated, a rotor blade bending moment may be present. For example, as the rotorcraft undergoes lift, the rotor blades may be subjected to an upward force. The blade retention cuffs 208 may include an outboard bearing 240. In an embodiment, the bearing 240 may be cylindrically shaped. In some embodiments, the bearing 240 may be an elastomeric bearing.

The bearing 240 may include one or more radial elements 240a that emerge from a blade retention cuff 208. The element 240a may pull upward and press against the topside of the blade retention cuffs 208 as the rotor blades are subjected to the upward force. As the element 240a and corresponding rotor blade are urged upwards, the inboard bearing 312 may be restrained from a (reciprocal) downward motion via a metal cylinder.

In some embodiments, one or more materials may be used to fabricate the rotor system 200. For example, in some embodiments, one or more of the components or devices of the rotor system 200 may be made of composite materials, such as graphite epoxy.

Figure 4:
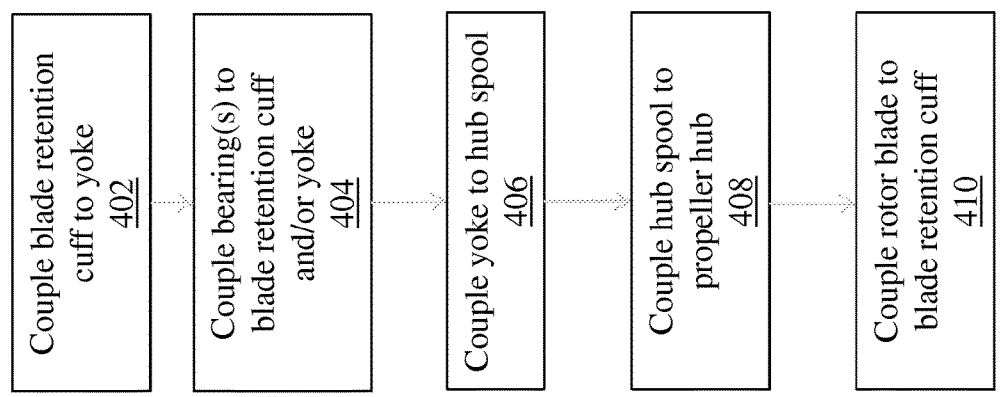
FIG. 4 illustrates a flow chart of an exemplary method.

Turning now to FIG. 4, a flow chart of an exemplary method 400 is shown. The method 400 may be executed in association with one or more systems, components, or devices, such as those described herein. The method 400 may be used to provide or fabricate a light-weight rotor system that has structural and functional integrity. The rotor system may be arranged such that loads are resolved in-plane of composite laminates, such that loading may be eliminated in a weak thru-thickness direction.

In block 402, a blade retention cuff may be coupled to yoke. For example, the blade retention cuff may be connected to the yoke using one or more bolts.

In block 404, one or more bearings may be coupled to the yoke or the blade retention cuff. For example, an inboard bearing may be located within an interior of the yoke and an outboard bearing may be located at least partially within the blade retention cuff.

In block 406, the yoke may be coupled to a hub spool of the rotor system.

In block 408, the hub spool may be coupled to (e.g., bolted to) a propeller hub. As part of block 408, the propeller hub may enclose at least a portion of the blade retention cuff and at least a portion of the yoke.

In block 410, a rotor blade may be coupled to the blade retention cuff. The coupling may occur using one or more pins. As part of block 410, the rotor blade may be folded by pulling out or removing the pins.

The method 400 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 4. In some embodiments, one or more portions of the method 400 may be repeated. For example, portions of the method 400 may be repeated for each of a number of rotor blades included in a given embodiment.

Embodiments of the disclosure may include a rigid rotor composite structural configuration. A propeller hub shaped graphic epoxy shell may be combined an inner tubular graphic epoxy CF retention shaft. A graphic epoxy blade retention cuff may be connected to two hubs through elastomeric pitch and thrust bearings. A titanium yoke may restrain CF and bending on an inboard end of the cuff.

Embodiments of the disclosure may include composite structural elements or components that may be used to reduce weight compared to conventional rotor systems. The rotor may be configured such that loads are resolved in-plane of all composite laminates, thereby eliminating loading in a weak thru-thickness direction. Elastomeric bearings may be utilized for enhanced reliability and maintainability compared to past rigid rotors.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A rotor, comprising:
    a blade retention cuff configured to receive a rotor blade;
    a yoke coupled to the blade retention cuff;
    an inboard bearing located in the interior of the yoke configured to restrain centrifugal force while enabling the yoke to pitch through an entire operating range; and
    a rigid propeller hub configured to enclose at least a portion of the blade retention cuff and at least a portion of the yoke, the rigid propeller hub includes a hub arm having a generally circular cross-section that extends along a portion of the blade retention cuff.

2. The rotor of claim 1, wherein the blade retention cuff is attached to the rotor blade using at least two pins.

3. The rotor of claim 2, wherein the at least two pins are configured to be removed to enable the rotor blade to fold.

4. The rotor of claim 1, wherein the yoke is made of titanium and is substantially horseshoe-shaped, and wherein the yoke is configured to be bolted to the blade retention cuff.

5. The rotor of claim 1, further comprising:
    an outboard bearing comprising a radial element configured to contact a top-side of the blade retention cuff when the rotor blade is subjected to an upward force.

6. The rotor of claim 1, further comprising:
    a hub spool bolted to the rigid propeller hub.

7. The rotor of claim 1, wherein the rigid propeller hub is made of a graphite epoxy composite material.

8. The rotor of claim 1, further comprising:
    a second blade retention cuff configured to receive a second rotor blade; and
    a second yoke coupled to the second blade retention cuff, wherein the rigid propeller hub is configured to enclose at least a portion of the second blade retention cuff and at least a portion of the second yoke.

9. The rotor of claim 1, wherein the rotor is included on an aircraft.

10. A method for fabricating a rotor, comprising:
    coupling a blade retention cuff configured to receive a rotor blade to a yoke;
    coupling an inboard bearing to the yoke within the interior of the yoke, wherein the inboard bearing is configured to restrain centrifugal force while enabling the yoke to pitch through an entire operating range; and
    enclosing at least a portion of the blade retention cuff and at least a portion of the yoke using a rigid propeller hub including a hub arm having a generally circular cross-section that extends along a portion of the blade retention cuff.

11. The method of claim 10, wherein the blade retention cuff is attached to the rotor blade using at least two pins.

12. The method of claim 11, further comprising:
    removing the at least two pins to enable the rotor blade to fold.

13. The method of claim 10, wherein the yoke is made of titanium and is substantially horseshoe-shaped, and wherein the yoke is bolted to the blade retention cuff using at least four bolts.

14. The method of claim 10, further comprising:
    coupling an outboard bearing comprising a radial element to the blade retention cuff, wherein the outboard bearing is configured to contact a top-side of the blade retention cuff when the rotor blade is subjected to an upward force during lift.

15. The method of claim 10, further comprising:
    bolting a hub spool to the rigid propeller hub.

16. The method of claim 10, wherein the rigid propeller hub is made of a graphite epoxy composite material.

17. The method of claim 10, further comprising:
    coupling a second blade retention cuff configured to receive a second rotor blade to a second yoke; and
    enclosing at least a portion of the second blade retention cuff and at least a portion of the second yoke.

18. The method of claim 10, further comprising:
    selecting a stiffness and mass for the rotor to satisfy a natural frequency criteria.

* * * * *